United States Patent Office 3,849,378
Patented Nov. 19, 1974

3,849,378
UREA FORMALDEHYDE PIGMENT
Darrell J. L. Griffiths, State College, Pa., and Denis K. Huang, Laurel, Md., assignors to Westvaco Corporation, New York N.Y.
No Drawing. Filed Jan. 3, 1973, Ser. No. 320,834
Int. Cl. C08g 9/10, 53/03
U.S. Cl. 260—69 R
13 Claims

ABSTRACT OF THE DISCLOSURE

A white, bright and opaque urea formaldehyde pigment, useful as a paper filler, is produced by precipitating a UF resin or prepolymer having a water tolerance of from about 1.5–2.0 and a viscosity of from about 450–1500 cps. at 50% solids in an aqueous bath containing from about 0.125–1.0% of an acid catalyst by introducing the UF resin into the aqueous acid catalyst precipitating bath over a period of time of from about 15 minutes to an hour, under agitation, and at a temperature of from about 25–90 degrees C., at a resin to water ratio of from about $1/16$ to $3/8$, said total reaction time requiring from about ½ to 5 hours.

SUMMARY OF INVENTION

This invention relates to a composition of matter, a process for producing the composition of matter and a product produced using the novel composition of matter. More particularly, the invention relates to a novel and useful synthetic polymeric pigmentary filler material prepared using a urea formaldehyde resin, which pigment is white, bright and opaque and which has a high wet end retention as compared with conventional filler materials in the papermaking process. Thus the invention is described in detail for use as a filler material in paper manufacture.

The loading or filling of paper with finely divided materials has been common practice for many years, and some mineral content is present in nearly all paper grades except for a few grades of specialty papers. The use of filler pigment makes paper more suitable for particular purposes. Some of the benefits are increased brightness, opacity, softness, smoothness, absorption, support of optical dyes, better ink holdout, reduced strike-through, improved printability, improved feel, better finishing characteristics, increased bulk and the control of porosity.

There are many fillers now available. Among these are china clay, talc, calcium sulfates, barium compounds, precipitated chalk, titanium dioxide, hydrated alumina and synthetic silicas and silicates. While each of these materials offers some advantages to the papermaker in particular cases, none can be considered to be generally satisfactory from the point of view of both cost and optical efficiency. In addition, many of these known materials have a low retention in the papermaking process which not only constitutes a waste but also a pollution problem.

On the other hand, the novel pigment of the present invention can be added like a conventional filler to increase the optical properties of the finished paper without seriously affecting the strength properties of the paper, and based on handsheet studies, it would appear that the pigment can be added at the wet end of a papermaking process with a retention of up to 70–80%, as compared to a retention of about 30% for clay and 40% for $TiO_2$ on a single pass basis.

The novel pigment of the present invention is preferably manufactured and used in slurry form, i.e., in aqueous suspension. However, if desired the manufactured material may be dried to as low as 75% moisture and then reslurried for later use without any reduction in optical properties. Accordingly, the present invention is based upon the discovery that a urea formaldehyde resin having particular measurable properties can be precipitated to produce a pigmentary filler material radically different from those known in the past. The precipitated pigment has a very good opacity as represented by its scattering coefficient of about 0.42–0.52, and this high opacity is surprising since the refractive index of urea formaldehyde is not particularly high, being about 1.65.

It is believed that the unique performance achieved with the pigment material in paper filler applications is due to a combination of primary particle size and the agglomerate structure produced in the process of making the pigment. The refractive index of the pigment would not suggest the high optical performance demonstrated by the pigment, however, it is well known that when the air-solid interface of a pigment is increased, its opacifying power is improved. The primary particles produced in the precipitation process are essentially flakes with an average size of approximately 0.1 to 0.5 micron. On the other hand, the agglomerate size is on the order of from 3 to 6 microns.

Thus, according to the present invention, an optically efficient and economic filler pigment is described which has many desirable qualities as a filler for papermaking, in addition to yielding an exceptionally high retention rate. Although the material of the present invention is particularly suitable as a pigment for paper and paper coating purposes, obviously its application could be extended to many other fields and the utility of the pigment should not be limited to the preferred description in the present invention.

The novel pigment described herein is preferably prepared by pre-polymerizing urea and formaldehyde in a more-or-less conventional manner to form a prepolymer slurry of a specific molecular weight and/or viscosity range. Subsequently, the prepolymer is then converted into the finely divided particles of the present invention according to the process conditions more specifically set forth hereinafter. Alternatively, and more conveniently, the novel pigmentary filler material of the present invention can be produced using urea formaldehyde resins available commercially in the market place. In this respect, the plywood adhesive grade urea formaldehyde resins have been found to be economical and suitable for the desired purpose. Of course, when the commercially available resins are employed, the resin slurry is converted into the desired pigment only when the process conditions set forth hereinafter are adhered to.

DETAILED DESCRIPTION

Urea formaldehyde is prepared conventionally by reacting urea and formaldehyde in the molar ratio of about 1 mole of urea to about 1.5–2.5 moles of formaldehyde. For the convenience of the control of the reaction, the polymerization is usually carried out in an alkaline aqueous medium to give methylol-urea derivatives such as mono and dimethyl ureas. Such compounds are precursors in the formation of cross-linked urea formaldehyde resins. The mechanism of the reaction is not known with any certainty, however, the properties of the polymer obtained depends on the molecular weight or degree of polymerization. The maximum obtainable molecular weight is limited by the ratio of the monomers present in the step growth polymerization reaction. By manipulating the ratio of monomers, catalysts and various reaction conditions, a variety of urea formaldehyde prepolymers can be made. In the practical application the prepolymers are normally carried into the second stage of reaction or the curing operation to obtain the ultimate or preferred properties with the use of catalysts, heat and various other means. The curing stage leads to the formation of more complex molecular network and structure introducing new factors into the general polymerization mechanism. Thus urea formaldehyde polymers are not a single compound of fixed chemical composition, and they may differ radically in molecular structure and physical properties depending on the initial monomer ratio and particularly with the subsequent reaction conditions used. However, according to the present invention, a class of urea formaldehyde resins has been developed which when subsequently treated in accordance with preferred process conditions, produces a pigment which has been found to be useful as a filler material, particularly in the papermaking process. The pigment is produced from the urea formaldehyde resin with a precipitation reaction to obtain the desired product. It is believed that the conditions and steps employed in the precipitation reaction are the key to obtaining the novel product disclosed herein.

Of course, the primary reason for the development of the present invention was the realization of the need for an optically efficient paper filler pigment that could be produced with a high yield and that would give good retention in the papermaking process. It was found that optical performance of the pigment produced depended primarily on a combination of the reaction variables employed, including the type of urea formaldehyde resin or prepolymer used, the type of catalyst employed, the reaction temperature, the resin to water ratio, the concentration of catalyst and the degree of homogenization. The effect of each of these variables turned out to be predictable and specific although a range of optimum conditions was found that would produce a high quality pigment.

In order to determine the optimum properties of the novel pigment produced by the present invention, experiments were conducted using different kinds of urea formaldehyde resins. Other experiments were run with different catalysts, and under different reaction temperatures, and, finally experiments were conducted wherein the catalyst concentration and degree of homogenization was varied. Based on these experiments a set of standards was obtained to show the permissible range of the variables that could be tolerated to insure a high yield from the process while still producing an optically efficient pigment. In each case, the optical properties of the pigment obtained were measured using a standard TAPPI handsheet method wherein measurements were taken of the opacity and brightness of the handsheets produced. These measurements were then compared with measurements of similar handsheets prepared from unfilled pulp and from handsheets filled with $TiO_2$.

It was known that white fillers would increase the opacity of paper, and at the same time, would also increase the brightness, as determined by the amount of light scattered, reflected and absorbed by the pigment. Moreover, generally the opacity increases as the particle size of the pigment is decreased until an optimum size is reached, since smaller particles have more surface planes through which the light must pass and be refracted or reflected.

However in the instant case, it is believed that the high air-solid interface found in the agglomerates contributes significantly to the opacifying power of the pigment. The results are illustrated in the comparison tests disclosed herein, wherein using the novel pigmentary filler material described, the values for brightness and opacity equalled those obtained with the use of a like amount of $TiO_2$. Moreover, because of the high retention of the urea formaldehyde pigment, it was found that values for opacity and brightness equivalent to those obtained using $TiO_2$ could be reached with a lower initial level of addition of the urea formaldehyde pigment. Finally, an economic analysis of the cost of preparation of the novel urea formaldehyde filler pigment disclosed herein illustrated that, as compared with $TiO_2$, the urea formaldehyde pigment was cheaper to use. This result was attributed to the higher retention of the urea formaldehyde pigment as compared to $TiO_2$ and the lower cost of raw materials for preparing the urea formaldehyde pigment.

Accordingly, for the purpose of manufacturing the urea formaldehyde pigment described in the present invention, one method would be to initially prepare a urea formaldehyde resin or prepolymer having as the peferred characteristics a water tolerance of about 1.5–2.0 and a viscosity of about 450–1500 cps. at 50% solids. The water tolerance is defined here as the volume ratio of water to resin dispersion which will not produce a precipitate. That is, the measure of the amount of water that could be added to a urea formaldehyde resin dispersion without producing an incipient lumpy precipitate. The viscosity range is inherently tied in with the molecular weight of the urea formaldehyde resin, and for the purpose of the present process, the resin must not be too viscous or it becomes impossible to handle from a physical standpoint. It is believed that urea formaldehyde resins having either a higher or lower viscosity could be used in the process described herein however, as a practical matter a viscosity range of from about 450–1500 cps. at 50% solids is preferred. Similarly urea formaldehyde resins having a water tolerance higher than 2.0 could also be used in the process herein. However a resin having a water tolerance higher than 2.0 tends to increase the subsequent converting time required and ultimately leads to a product having low optical efficiency.

Thus as noted above, a urea formaldehyde resin suitable for the present invention is prepared by reacting urea with a formaldehyde or a paraformaldehyde aqueous solution in the ratio of about 1 mole of urea to about 1.5–2.0 moles of formaldehyde at a total solids content of approximately 50–70%. To this mixture, about 0.1–1.0% of an alkaline compound or salt catalyst is added and the mixture is adjusted to a pH of 6.5–12 with the addition of a buffering agent. The reaction is then carried out at a temperature which may range from room temperature up to 95 degrees C. for from 30 minutes to several hours depending on the reaction conditions. It has been found that alkaline compounds or salt catalysts such as sodium hydroxide, barium hydroxide, sodium carbonate, ammonium hydroxide, or amines such as pyridines and hexamethylene tetramine may be used in the preparation of the urea formaldehyde resin. However, other catalysts such as potassium hydroxide salts of calcium and lithium should also serve nicely as the catalyst component. In addition, for the purpose of buffering the mixture, sodium salts including sodium borate and the sodium phosphates may be used.

Subsequently, the reaction noted above would be carried out beyond or slightly beyond the methylol urea stage to result in a urea formaldehyde colloidal dispersion having the desired properties, i.e., a Brookfield viscosity of about 450–1500 cps. (no. 4 spindle at 20 r.p.m., 50% solids) and a water tolerance of about 1.5–2.0. Alternatively, a commercially available urea formaldehyde resin could be used as long as the resin had the desired properties noted above.

Finally, the novel pigment product of the present invention is prepared using either the commercially available urea formaldehyde resin or the prepared resin or prepolymer in accordance with the following process steps. A reaction vessel is provided with a variable speed mixer or agitator, a reflux condenser and a dropping funnel. An aqueous precipitating bath is introduced into the vessel containing from 0.125–1.0% by volume of a catalyst material. The reaction temperature is adjusted to between about 25 and 95 degrees C. and the previously prepared or otherwise obtained urea formaldehyde resin is added from the dropping funnel to the vessel under moderate agitation over a period of from 15 minutes to an hour. The resin to water ratio, based on solid content of the resin may vary from about 1–20 to 3–8 and upon completion of the addition of the resin, the reaction is allowed to continue for a time suffient to precipitate all of the resin, or for a total reaction time of from about ½ to 5 hours. Thus the total reaction time includes the time for addition of the resin to the precipitating bath, and it is believed that the novelty of the present invention lies partially in the process steps set forth above to produce the novel product described.

Shortly after introducing the resin or prepolymer into the reaction vessel, a fine white precipitate will appear in the precipitating bath. The amount of precipitate will increase as the reaction continues and more resin is introduced. The precipitate may be in fibrid or particle form depending on the agitation rate and other reaction conditions used. If the resin is added too quickly, a lumpy and jelly like mass results hence the time of addition of the resin to the catalyst reaction medium is deemed critical. Of course, the resin could be added over an extremely long period of time with satisfactory results, however this procedure would only be a burden on the production.

Upon completion of the reaction, the resultant pigment is cooled, filtered and washed free of catalyst contamination. The pigmentary product is then redispersed in water under high speed agitation to break up any large aggregate in the product, and finally the pigment is homogenized into proper size for the application intended.

For the purpose of arriving at the optimum water tolerance and viscosity characteristics of the urea formaldehyde resins suitable for producing the novel pigment disclosed herein, three different commercially available urea formaldehyde resins having known or measurable viscosity and water tolerance were reacted as set forth above. In each case the pigment obtained was incorporated at the level of a 10% addition to the furnish in the preparation of TAPPI handsheets and the optical properties of the sheets were measured. The measurements obtained were then compared with the optical properties of handsheets prepared from 100% pulp and the results of the experiment are shown in Table I below.

TABLE I.—EFFECT OF TYPE OF RESIN

[10% pigment in furnish]

| Example | Viscosity, cps. (50% solids) | Water tolerance | Optical properties | |
|---|---|---|---|---|
| | | | Opacity | Brightness |
| Control | | | 69.9 | 82.7 |
| Resin: | | | | |
| A | 1,420 | 1.5-2.0 | 82.8 | 84.9 |
| B | 70 | 5 | 73.3 | 84.5 |
| C | 80 | >2.5 | 76.7 | 84.0 |
| D | 210 | 4 | 76.9 | 82.0 |
| E | 450 | 2.0-3.0 | 77.4 | 82.4 |
| F | 520 | 2.0 | 77.0 | 81.8 |

NOTE.—All data corrected to a handsheet basis weight of 60.4 gr./m.$^2$.

Resins A and B are urea formaldehyde resins supplied by the Borden Chemical Company and identified as Borden PR 703-78 and Borden L-195 respectively. Resin C is a urea formaldehyde resin supplied by the Gulf Chemical Company and identified as Gulf L-100. Resins D, E and F have the same chemical composition as Resin A (Borden PR 703-78) except for the differences in viscosity and water tolerance due to the differences in the molecular weight of the examples.

The results obtained clearly show that superior optical properties were obtained with Resin A which had a relatively high viscosity and a low water tolerance as compared with Resins B and C. The other resins tried having different viscosity and water tolerance levels (Resins D, E and F), similarly showed satisfactory performance, and from the experiments identified above plus other unrecorded experiments, it was concluded that for the purposes of the present invention a resin having a viscosity of from about 450–1500 cps. and a water tolerance of from about 1.5–2.0 would be preferred.

Subsequently, to examine the effects of the various process conditions in the manufacture of the pigment, additional samples of the best performing resin, Resins A, were prepared and reacted to obtain the pigment, and finally, additional handsheets were made and the optical properties measured. As noted hereinbefore, it was determined that the most efficient optical properties of the pigment produced was dependent on an optimum combination of reaction variables. The reaction variables involved were determined to be, (1) the type of resin or prepolymer used, (2) the type of catalyst employed, (3) the reaction temperature, (4) the resin to water ratio, (5) the catalyst concentration, and (6) the degree of homogenization. Accordingly, the additional samples of Resin A were first tested with different catalysts and the results obtained were set forth in Table II below.

TABLE II.—TYPE OF CATALYST

[10% pigment in furnish]

| Example | Catalyst, 0.5% conc. | Optical properties | |
|---|---|---|---|
| | | Opacity | Brightness |
| Control | | 68.9 | 82.7 |
| Resin A | $H_2SO_4$ | 84.4 | 86.1 |
| Do | $H_3PO_4$ | 70.7 | 80.7 |
| Do | Maleic anhydride | 71.5 | 81.0 |
| Do | Benzene sulfonic acid | 71.7 | 80.9 |

The results obtained above demonstrate a marked advantage in the optical performance of the pigment precipitated with $H_2SO_4$ as compared with the outer catalysts used. It is believed, however, that other strong mineral acids of the same class as $H_2SO_4$ such as HCl, would perform equally well. In fact, when different groups of catalysts were tried during the development work on the present invention, it was found that the weak mineral acids (boric acid and phosphoric acid), and certain organic acids (maleic anhydride, acetic acid, benzene sulfonic acid and citric acid) were only reasonably satisfactory as a catalyst material. In addition, acid salts such as calcium chloride and ammonium chloride also proved to be ineffective as a satisfactory catalyst. In each case, however, the catalytic activity depended on the specific compound rather than the generic group.

It was also found in the background experiments that the choice of catalyst had a direct influence on the percent pigment retention in the handsheets. However based on the experiments performed, $H_2SO_4$ was found to be the best performing catalyst both with respect to the optical properties obtained and the pigment retention measured.

Additional experiments were then conducted to determine the effect of the reaction temperature on the pigment produced according to the precipitation reaction. It was suspected that the temperature of the acid catalyst precipitating bath would influence the optical properties of the resulting pigment to a considerable degree. In addition, it was believed that an optimum range of reaction temperature could be determined by measuring the optical properties of the pigment produced at several selected temperatures. This suspicion was confirmed as shown by the results reproduced below, however, the influence of temperature proved to be greater with respect to the yield from the process rather than the optical performance of the pigment produced. The results of the temperature experiments are shown below in Table III.

TABLE III.—REACTION TEMPERATURE EFFECTS

[Catalyst conc. 0.5% $H_2SO_4$, 10% pigment in furnish]

| Example | Reaction temp., °C. | Optical properties | |
|---|---|---|---|
| | | Opacity | Brightness |
| Control | | 71.7 | 79.1 |
| Resin A | 25 | 77.6 | 81.6 |
| Do | 40 | 81.0 | 82.5 |
| Do | 60 | 82.8 | 83.1 |
| Do | 70 | 83.8 | 84.9 |
| Do | 80 | 76.4 | 81.3 |

In this experiment, the pulp used was from a different batch than that used in the Examples in Tables I and II.

Accordingly, the opacity and brightness of the control was different from the control of the first experiments. Of course, in these trials as before, the pigment was incorporated in the furnish at the 10% addition level and TAPPI handsheets were again prepared. The optical properties of the sheets were measured and recorded and as illustrated from the above data, the reaction temperature did play an important role in the optical properties of the pigment produced using the preferred resin/catalyst combination, with the most optically efficient product being obtained at a reaction temperature of about 70° C.

Next the effect of resin to water ratio on the optical performance of the pigment produced was measured. For these experiments, the best performing resin, Resin A, was again used with a 0.5% conc. of $H_2SO_4$ in the precipitating bath. In each case, the resin was introduced into the precipitation bath in accordance with the preferred process conditions (i.e., from a dropping funnel over the course of an extended period of time), the precipitate produced was washed free of catalyst contamination and incorporated into handsheets at the 10% level, and finally the optical properties of the hand sheets were measured and recorded. The results of these experiments are set forth in Table IV below.

TABLE IV.—RESIN TO WATER RATIO

[Catalyst conc. 0.5% $H_2SO_4$, 10% pigment in furnish]

| Example | Resin water ratio | Optical properties | |
|---|---|---|---|
| | | Opacity | Brightness |
| Control | | 68.9 | 82.7 |
| Resin A | 1/16 | 80.1 | 82.6 |
| Do | 1/8 | 84.0 | 85.3 |
| Do | 3/8 | 79.8 | 83.4 |

Accordingly, based on the data above, a satisfactory product was obtained over the course of resin to water ratios from 1/16 to 3/8. However, it was observed that for ratios greater than 3/8 the optical performance of the product began to decrease. On the other hand, the optimum resin/water ratio was observed to be approximately 1/8. Additional experiments conducted using different catalyst/resin combinations showed that the effect of resin to water ratio on the pigment obtained was dependent on the catalyst used. For the strong mineral acids, the optical performance increased at the lower resin to water ratios. On the other hand, with the weak acids and other organic catalysts, the trend was just the opposite with better optical performance being achieved at the higher resin/water ratios.

The catalyst concentration in the precipitating bath also turned out to be a significant factor in the optical performance of the pigment produced. A series of experiments were made using the best performing resin, Resin A, and $H_2SO_4$ as the catalyst in the precipitating bath at levels of 0.125%, 0.5%, 1.0% and 1.5% by volume of the amount of water in the bath. The results of those experiments are reproduced below in Table V.

TABLE V.—CATALYST CONCENTRATIONS

[10% pigment in furnish]

| Example | Catalyst conc., percent $H_2SO_4$ | Optical properties | |
|---|---|---|---|
| | | Opacity | brightness |
| Control | | 71.1 | 79.1 |
| Resin A | 0.125 | 80.2 | 83.4 |
| Do | 0.5 | 83.8 | 84.9 |
| Do | 1.0 | 79.7 | 82.1 |
| Do | 1.5 | 78.6 | 82.0 |

The results demonstrated that the opacity and brightness values of the pigment decreased as the catalyst concentration increased from 0.5 to 1.0%. Meanwhile, the yield of the pigment from the reaction proved to be low at the lower concentrations while reaching a maximum at the 1% by volume catalyst concentration level.

Finally, a separate series of experiments were conducted with Resin A to optimize the degree of homogenization on the optical performance of the pigment. The effect of homogenization was deemed important both from the optical efficiency standpoint and because of the wide range of particle size distribution obtained in the process. It was felt that some form of homogenization or screening of the pigment would be required where the pigment was to be used in a papermaking process simply to avoid any lumps in the finished sheet of paper. Accordingly, samples of the pigment obtained from a reaction using Resin A and a 0.5% $H_2SO_4$ catalyst bath were homogenized at different pressures, the pigment samples were then incorporated in standard TAPPI handsheets and the optical properties of each sheet measured. The results of these experiments are set forth in Table VI below.

TABLE VI.—HOMOGENIZATION EFFECTS

[Catalyst conc. 0.5% $H_2SO_4$, 10% pigment in furnish]

| Example | Homogenization pressure, p.s.i.g. | Optical properties | |
|---|---|---|---|
| | | Opacity | Brightness |
| Control | | 68.9 | 82.7 |
| Resin A | 0 | 84.1 | 86.9 |
| Do | 500 | 83.3 | 86.3 |
| Do | 1,000 | 84.5 | 86.7 |
| Do | 2,000 | 84.4 | 87.5 |
| Do | 4,000 | 84.0 | 86.9 |
| Do | 8,000 | 82.0 | 85.8 |

Thus it may be seen from the above data that the optimum optical performance of the pigment produced was found at a homogenization pressure of from 1000–2000 p.s.i.g.

Accordingly based on the different experiments and the data obtained, the optimum combination of process variables for the production of the novel urea formaldehyde pigment disclosed herein were determined to be as follows. The type of resin or prepolymer was found to be the single most important factor in determining the optical performance of the urea formaldehyde pigment. A comparison of three commercially available resins illustrated that both the viscosity and the water tolerance of the resin determined whether or not a product satisfactory for the present invention could be obtained by practicing the process disclosed herein. Thus it was found that a resin having a viscosity of at least about 450 cps. or higher at 50% solids and a water tolerance of at least about 1.5 was preferred. The higher molecule weight and/or viscosity resins were useful in the present invention until such time that the resins became too viscous to readily flow from the dropping funnel. However for the purposes of the invention herein an upper limit of around 1500 cps. at 50% solids was deemed appropriate. The most efficient catalyst tried proved to be $H_2SO_4$ although it is believed that any other strong mineral acid would perform equally well. The optimum catalyst concentration in the acid precipitating bath was found to be 0.5% by volume based on water (or a 0.5% aqueous solution), however as noted, different concentrations of different catalyst/resin systems did not follow the general rule. The most favorable reaction temperature, both from the standpoint of optical efficiency and yield was found to be about 70° C. The optimum reaction time, although not specifically covered by any of the experiments included herein was found to be on the order of about a 15-30 minute resin addition time (to the acid precipitating bath) with from 3/4 to 1 1/2 hour additional heating/reaction time for a total of about 2 hours. The most favorable resin to water ratio although dependent on the catalyst used, was for the preferred catalyst ($H_2SO_4$), about ⅞ weight basis based on resin solids. And finally, as noted above, the preferred homogenization pressure was found to be between 1000–2000 p.s.i.g. Thus using the optimum conditions, 200 grams of a urea formaldehyde resin at 50% solids would be added to a 1600 cc. precipitating bath containing 0.5% $H_2SO_4$ by volume, over the course of about 30 minutes with an additional 1½ hours allowed for a complete reaction. From this reaction about 60 grams of pigment could be expended giving a yield of around 60%.

Hence it may be seen from the above description that the present invention defines a novel process with optimum variable conditions for producing a novel urea formaldehyde pigment that is useful as a filler for the paper industry. Further, it is believed that the organic pigment produced in accordance with the present invention would make a good substitute for $TiO_2$ as a paper filler material. To illustrate the efficiency of the allegation, the preferred resin of the present invention, Resin A, was reacted under the preferred conditions set worth herein to produce a pigment material for comparison in paper handsheets with similarly filled $TiO_2$ sheets. The result of that experiment is disclosed below in Table VII.

TABLE VII

[Optical properties comparison, $TiO_2$ and UF pigment]

| Example | Percent filler in furnish | Optical properties | |
|---|---|---|---|
| | | Opacity | Brightness |
| Control | | 69.7 | 80.5 |
| UF | 10 | 83.6 | 85.8 |
| UF | 12.5 | 85.5 | 86.4 |
| UF | 15 | 87.5 | 86.6 |
| UF | 20 | 88.8 | 88.0 |
| $TiO_2$ | 10 | 82.4 | 83.9 |
| $TiO_2$ | 12.5 | 80.9 | 84.2 |
| $TiO_2$ | 15 | 83.2 | 84.8 |
| $TiO_2$ | 20 | 88.2 | 87.8 |

Accordingly it may be seen that in each case, at equal levels of addition of either the novel pigment described herein or $TiO_2$, the handsheet containing the pigment of the present invention appears to offer better optical performance. This result is deemed to be partly caused by the higher single pass retention of the urea formaldehyde pigment as compared to $TiO_2$ and further simply because the urea formaldehyde pigment disclosed is more efficient than $TiO_2$. Moreover, based on the performance of the pigment produced by the present invention, it is believed that as little as 1% by weight of the pigment could be an effective amount of addition for the sake of demonstrating an improvement in the optical properties of the handsheets produced.

In each of the experiments disclosed, the precipitation process was carried out in batch quantities however the same reaction could also feasibly be carried out in a continuous operation. Of course the foregoing experiments clearly demonstrate that a novel and useful pigment for use as a paper filler can be prepared from some commercially available urea formaldehyde resins when the reactions are carried out in certain ranges as set forth.

In determining the scattering coefficient for the novel pigmentary filler material of the present invention, the opacity of the handsheets containing the filler was first measured according to Tappi Standard T 425 with a B & L opacimeter. Reflectance of the handsheets was then determined at 457 millimicrons by use of an LRI integrating sphere reflectometer. Control handsheets, similar in all respects to the filled sheets except that they contained papermaking pulp only, were also tested for opacity. By use of Tappi Data Sheet No. 65, which contains a graphical solution of the Kubelka-Munk equations relating Tappi opacity, bulk reflectance, and total light scattering power of the handsheet, the latter was determined. Total light scattering power is defined as the product of the scattering coefficient and the basis weight of the handsheet, based on a 3300 square feet ream.

To determine the total scattering power for the urea formaldehyde pigment in a filled handsheet, the scattering coefficient for pulp, determined from the Control, was multiplied by the weight of pulp in the filled sheet, and this value was subtracted from the total scattering power of the filled sheet to obtain the scattering value for the filler portion of the sheet. The scattering coefficient for the filler was then determined by dividing the total scattering value for the filler by the basis weight of the filler in the handsheet. The scattering coefficient for the urea formaldehyde pigment described hereinbefore was determined in the above-described manner.

Obviously, the precise proportions of materials utilized may be varied, equivalents of said materials may be substituted, and various additives may be omitted or included as desired, without departing from the spirit and scope of the invention as defined in the appended claims.

We claim:

1. Process for the preparation of a white, bright and opaque precipitated urea formaldehyde pigment in slurry form for use in a papermaking operation which comprises the steps of:
   (a) selecting a urea formaldehyde resin that has been reacted at least to its water insoluble stage, said resin having a water tolerance of from about 1.5 to 5.0 and a viscosity of at least about 450 cps. at 50% solids;
   (b) precipitating said resin in an aqueous precipitating bath containing from about 0.125 to 1.5% by volume of a strong mineral acid catalyst at a temperature of from about 20–95 degrees C., under agitation, at a resin to water ratio of from ¹⁄₁₆ to ⅜, by adding said resin to the precipitating bath over a period of time ranging from about 15 minutes to one hour to form the precipitated urea formaldehyde pigment; and,
   (c) reacting the mixture of resin and precipitating bath for an additional period of time to insure a total reaction time of from about ½ to 5 hours before collecting the precipitated pigment product and homogenizing the product to a particle size of from about 0.1 to 0.5 micron in an agglomerated structure of from about 3 to 6 microns.

2. The process of claim 1 wherein the strong mineral acid in the precipitating bath is $H_2SO_4$ in a concentration of about 0.5%.

3. The process of claim 2 wherein the temperature of the precipitating bath is adjusted to about 70 degrees C.

4. The process of claim 3 wherein the period of time for the addition of the resin to the precipitating bath is about 30 minutes and the resin to water ratio is about ⅛.

5. The process of claim 4 wherein the total time period for the precipitating reaction is about 2 hours.

6. The process of claim 5 wherein the precipitated pigment product in slurry form is subjected to the additional steps of:
   (d) cooling the pigment slurry;
   (e) filtering the pigment product from the slurry;
   (f) washing the pigment product free of catalyst contamination; and,
   (g) redispersing the pigment product in water before the homogenization step.

7. Process for the preparation of a white, bright and opaque precipitated urea formaldehyde pigment in slurry form which comprises:
   (a) selecting a urea formaldehyde resin that has been reacted at least to its water insoluble stage to yield a water tolerance of at least about 1.5 and a viscosity of at least about 450 cps. at 50% solids;

(b) preparing an aqueous precipitating bath containing from about 0.125 to 1.5% by volume of a strong mineral acid catalyst selected from the group consisting of $H_2SO_4$ and HCl;

(c) adjusting the temperature of the precipitating bath to about 25–90 degrees C.;

(d) introducing the resin of step (a) into the precipitating bath of step (b) over a period of time ranging from about 15–60 minutes, under agitation, and at a resin to water ratio of from about 1/16 to 3/8 to form the precipitated urea formaldehyde pigment;

(e) reacting the mixture of resin and precipitating bath for an additional period of time to precipitate all of the resin and to insure a total reaction time of from about 1/2 to 5 hours;

(f) cooling, filtering and collecting the precipitated pigment from the reaction of step (e);

(g) washing the pigment free of catalyst contamination; and, (h) homogenizing the pigment to a particle size of from about 0.1 to 0.5 micron in an agglomerated structure of from about 3 to 6 microns.

8. The process of claim 7 wherein the precipitating bath contains about 0.5% by volume of $H_2SO_4$, the temperature of the precipitating bath is adjusted to about 70 degrees C., the resin is introduced to the precipitating bath over a period of time of about 30 minutes and at a resin to water ratio of about 1/8, and the total reaction time is about 2 hours.

9. Process for the preparation of a white, bright and opaque precipitated urea formaldehyde pigment in slurry form which comprises:

(a) preparing a urea formaldehyde prepolymer by reacting at least to the water insoluble stage about one mole of urea with about 1.5 to 2.0 moles of formaldehyde at a total solids content of about 50–70% in the presence of an alkaline catalyst at a pH of from about 6.5 to 12, a temperature of about 20–95 degrees C., for at least about 30 minutes, said alkaline catalyst being present in an amount of about 0.1 to 1% based on the weight of total solids;

(b) precipitating a pigment from the prepolymer prepared in step (a) by introducing the prepolymer into an aqueous precipitating bath at a resin to water ratio of from 1/16 to 3/8 in controlled amounts and under agitation, said aqueous precipitating bath containing from about 0.125 to 1.5% by volume of a strong mineral acid catalyst, at a temperature of from about 25 to 90 degrees C., said prepolymer introduction requiring from about 15 to 60 minutes with a total reaction time of from 1/2 to 5 hours;

(c) cooling, filtering and collecting the precipitated pigment from the reaction in step (b);

(d) washing the pigment free of acid catalyst contamination; and (e) homogenizing the pigment to a particle size of from about 0.1 to 0.5 micron in an agglomerated structure of from about 3 to 6 microns.

10. The process of claim 9 wherein the urea formaldehyde prepolymer has a water tolerance of at least 1.5 and a viscosity of at least 450 cps. at 50% solids.

11. A precipitated urea formaldehyde pigment in the form of flakes having an average particle size of about 0.1 to 0.5 micron distributed in an agglomerated structure ranging from about 3 to 6 microns in size, and having a scattering coefficient ranging from about 0.42–0.52 produced in accordance with the following steps comprising:

(a) selecting a urea formaldehyde resin that has been reacted at least to its water insoluble stage, and having a water tolerance of from about 1.5 to 5.0 and a viscosity of at least about 450 cps. at 50% solids;

(b) precipitating said resin in an aqueous precipitating bath containing from about 0.125 to 1.5% by volume of a strong mineral acid at a temperature of from about 20–95 degrees C., under agitation, at a resin to water ratio of from about 1/16 to 3/8, by adding said resin to the precipitating bath in controlled amounts over a period of time ranging from about 15 minutes to one hour to form the precipitated urea formaldehyde pigment; and, (c) reacting the mixture of resin and precipitating bath for an additional period of time to insure a total reaction time of from about 1/2 to 5 hours before collecting the precipitated pigment product and homogenizing the product to the stated particle size.

12. A precipitated urea formaldehyde pigment in the form of flakes having an average particle size of about 0.1 to 0.5 micron distributed in an agglomerated structure ranging from about 3 to 6 microns in size, and having a scattering coefficient ranging from about 0.42–0.52 produced in accordance with the following steps comprising:

(a) preparing a urea formaldehyde prepolymer having a water tolerance of at least about 1.5 and a viscosity of at least about 450 cps. at 50% solids by reacting at least to the water insoluble stage about one mole of urea with about 1.5 to 2.0 moles of formaldehyde at a total solids content of about 50–70% in the presence of an alkaline catalyst at a pH of from about 6.5 to 12, a temperature of about 20–95 degrees C., for at least about 30 minutes, said alkaline catalyst being present in an amount of about 0.1 to 1% based on the weight of total solids;

(b) precipitating a pigment from the prepolymer prepared in step (a) by introducing the prepolymer into an aqueous precipitating bath at a resin to water ratio of from 1/16 to 3/8 in controlled amounts and under agitation, said aqueous precipitating bath containing from about 0.125 to 1.5% by volume of a strong mineral acid catalyst, at a temperature of from about 25 to 90 degrees C., said prepolymer introduction requiring from about 15 to 60 minutes with a total reaction time of from 1/2 to 5 hours;

(c) cooling, filtering and collecting the precipitated pigment from the reaction in step (b);

(d) washing the pigment free of acid catalyst contamination; and, (e) redispersing the pigment in water prior to homogenizing the pigment to the stated particle size.

13. A precipitated urea formaldehyde pigment in the form of flakes having an average particle size of about 0.1 to 0.5 micron distributed in an agglomerated structure ranging from about 3 to 6 microns in size, and having a scattering coefficient ranging from about 0.42–0.52 produced in accordance with the following steps comprising:

(a) selecting a urea formaldehyde resin that has been reacted at least to its water insoluble stage to yield a water tolerance of at least about 1.5 and a viscosity of at least about 450 cps. at 50% solids;

(b) preparing an aqueous precipitating bath containing from about 0.125 to 1.5% by volume of a strong mineral acid selected from the group consisting of $H_2SO_4$ and HCl;

(c) adjusting the temperature of the precipitating bath to about 25–90 degrees C.;

(d) introducing the resin of step (a) into the precipitating bath of step (b) over a period of time ranging from about 15–60 minutes, under agitation, and at a resin to water ratio of from about 1/16 to 3/8 to form the precipitated urea formaldehyde pigment;

(e) reacting the mixture of resin and precipitating bath for an additional period of time to precipitate all of the resin and to insure a total reaction time of from about 1/2 to 5 hours;

(f) cooling, filtering and collecting the precipitated pigment from the reaction of step (e);

(g) washing the pigment free of acid catalyst contamination; and, (h) homogenizing the pigment to the stated particle size.

References Cited

UNITED STATES PATENTS

| | | | |
|---|---|---|---|
| 1,536,882 | 5/1925 | Ellis | 260—69 X |
| 1,846,853 | 2/1932 | Ellis | 260—69 X |
| 1,905,999 | 4/1933 | Ellis | 260—69 |
| 2,461,089 | 2/1949 | Smidth | 260—67.6 R |
| 2,016,594 | 10/1935 | Dearing | 260—69 |
| 2,623,028 | 12/1952 | Love | 260—67.6 R X |
| 2,624,514 | 1/1953 | Wilhousky | 260—67.6 R X |
| 3,248,255 | 4/1966 | Belasco et al. | 260—69 R X |
| 3,428,607 | 2/1969 | Renner | 260—67.6 |
| 3,553,115 | 1/1971 | Curchod et al. | 260—69 R X |
| 1,967,261 | 7/1934 | Ripper | 260—69 |

OTHER REFERENCES

Chemistry of Commercial Plastics, 1947, pp. 66–67, 76–77, 176–178, 192–193, Wakeman.

Amino Resins, Blais, 1959, pp. 27–31, 54–58, 61–62.

HOWARD E. SCHAIN, Primary Examiner

U.S. Cl. X.R.

260—29.4 R; 162—166, 167